United States Patent [19]

Morse

[11] 3,752,936

[45] Aug. 14, 1973

[54] KEY TELEPHONE CALL DISTRIBUTING SYSTEM

[75] Inventor: Charles Ernest Morse, Holmdel, N.J.

[73] Assignee: Bell Telephone Laboratories, Murray Hill, N.J.

[22] Filed: May 30, 1972

[21] Appl. No.: 258,106

[52] U.S. Cl. .................................. 179/99, 179/27 D
[51] Int. Cl. .............................................. H04m 3/22
[58] Field of Search ................ 179/99, 27 D, 27 FC, 179/94, 81 C, 84 C

[56] References Cited

UNITED STATES PATENTS

| | | | |
|---|---|---|---|
| 2,757,240 | 7/1956 | Gatzert | 179/27 D |
| 2,945,917 | 7/1960 | Clark et al. | 179/27 D |
| 2,176,340 | 10/1939 | Hensler et al. | 179/27 D |
| 2,817,714 | 12/1957 | Lomax | 179/41 R |

*Primary Examiner*—Kathleen H. Claffy
*Assistant Examiner*—Kenneth D. Baugh
*Attorney*—W. L. Keefauver and Everett J. Olinder

[57] ABSTRACT

The circuitry of a standard key telephone system is modified to serve as a call distributing system. A gate circuit, associated with the key telephone line circuits, is arranged to establish a first timed interval during which all incoming connections to the station are processed in a manner such that the associated line lamp at the key telephone station provides a first visual indication. The line lamps associated with incoming connections arriving at the conclusion of the first timed interval are arranged to provide a second mode distinctive visual indication. When all of the first mode lines are answered, the second mode lines are switched to the first mode and the associated line lamps are changed from second mode distinctive flashing to first mode flashing. When any incoming connection remains unanswered for a predetermined interval, a special announcement is returned over the associated incoming line.

7 Claims, 5 Drawing Figures

KEY TELEPHONE CALL DISTRIBUTING SYSTEM

BACKGROUND OF THE INVENTION

This invention is directed to an arrangement for providing call distributing and call queueing features economically among a small number of telephone lines and attendant stations.

It is a well-known concept that the per unit cost of a manufactured item falls as the production volume of that item increases. Thus, manufacturers of special products find themselves faced with a classic dilemma since, on the one hand, they must attempt to reduce costs by volume production while at the same time provide the exact piece of equipment desired for a particular service. The telephone industry faces this problem when it is desired to provide specialized telephone service to certain subscribers.

A typical example of a manifestation of the problem occurs when it is desired to provide call distributing and call queueing equipment for calls incoming over a number of lines to attendant stations. One solution is to distribute the cost of the complex control equipment over the number of lines served by that equipment. However, in systems where the number of incoming lines required is small, the cost, even on a per line basis, becomes prohibitive.

The sophistication and complexity of such call distributing systems can be appreciated from a review of U.S. Pat. No. 3,643,034 of T. V. Burns, J. M. Catterall, G. L. Elliott and R. E. Fenstermaker issued Feb. 15, 1972. The Burns et al. system, while a substantial contribution to the call distributing art, highlights the manufacturing problems from a cost standpoint if such a system were to be used to satisfy a demand for the distribution of calls incoming over a relatively few, for example, 20 incoming lines.

This problem is compounded in that it is desirable to arrange such systems so that calls may be answered from a number of different stations. Thus, it is necessary to provide control circuitry to accomplish this function, again increasing the cost of the service to the subscriber.

Another problem arises from the fact that the market for such systems is extremely limited and, thus, manufacturing economies which otherwise could be used to reduce the cost of the service are unavailable.

Accordingly, a need exists in the art for a call distributing system adopted for providing service on a relatively few lines in an economical manner, taking full advantage of all possible manufacturing economies.

In call distributing systems it is often necessary to provide priority answering on certain lines. In sophisticated systems the switching network is arranged to accommodate such a requirement, usually by the use of the system memory. This presents a problem since when it is desired to change the priority line, or to add a new priority line, the system must be reoriented.

Accordingly, a further need exists in the art for a call distributing system wherein priority answering can be provided on any line without reorienting the system plan.

SUMMARY OF THE INVENTION

In typical call distributing systems the incoming calls are first queued and then routed to an attendant when that attendant becomes idle. Thus, each attendant is permitted to answer only that call which has been in the queue longest. The attendant then has no discretion as to which call will be answered since the machine controller routes only one call at a time to the attendant. By recognizing that it is possible to route all of the incoming calls to all of the attendants immediately upon receipt of the calls and to provide each of the attendants with visual signals indicative of the order of arrival of the calls, I have devised a call distributing system meeting the requirements of economy and versatility. I have accomplished this result by combining the desired call distributing function with the well-known standard key telephone arrangement, thereby using the manufacturing economies inherent in key telephone systems. Queueing is accomplished by visual indications provided to the stations by a gating circuit arranged to operate in conjunction with the standard line circuit of the key telephone system.

Distinctive lamp signaling is used to communicate to the attendant the order in which lines should be answered. The gating circuit is controlled by a clock and by the busy-idle status of the incoming lines. When the gate is open, the system operates in the first mode such that all incoming calls are connected through the line circuit to the attendant station and the lamp associated with that line at the station is flashed in a first distinctive manner. The gate circuit is open only for a small portion of time and only the lamps associated with lines having incoming calls thereon when the gate is open are so flashed. When the gate is closed the circuit functions in a second mode such that the lamps associated with lines having incoming calls arriving during the second mode operation are flashed at a distinctive rate.

The gate circuit remains closed as long as any incoming call from the group of calls arriving before the gate was last closed, i.e., first mode group of calls, remains unanswered. If the gate remains closed for longer than a predetermined interval, an announcement is returned over all of the unanswered calling lines.

Accordingly, it is a feature of my invention to provide an economical circuit for distributing and queueing calls incoming over a number of lines in a manner such that each call is answered by an attendant in approximately the same order as the order in which the call arrived.

It is another feature of my invention that a standard key telephone arrangement is modified to provide distinctive signaling to an attendant as an indication of the relative order in which the calls associated with lighted line lamps should be answered.

It is still another feature of my invention to arrange call distributing circuitry operatively to provide distinctive lamp signals to an attendant in a manner allowing the attendant to answer incoming calls on a priority basis on any line selected by the attendant.

DESCRIPTION OF THE DRAWING

The foregoing objects, features and advantages, as well as others of the invention, will be more apparent from the following description of the drawing, in which.

Figure 2:
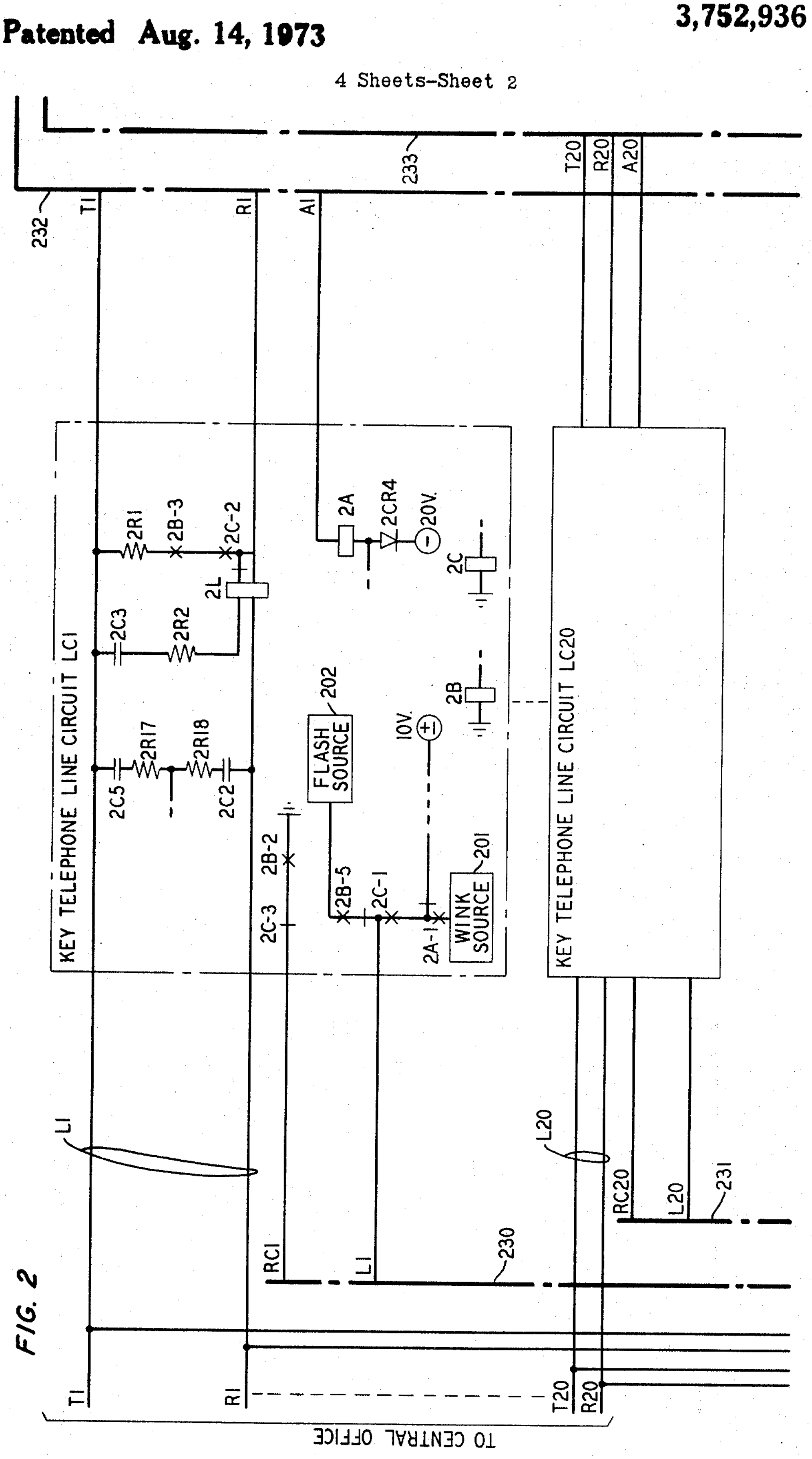
FIGS. 2 through 4 are schematic drawings showing in greater detail the interrelation of the components of the exemplary embodiment.
Figure 3:
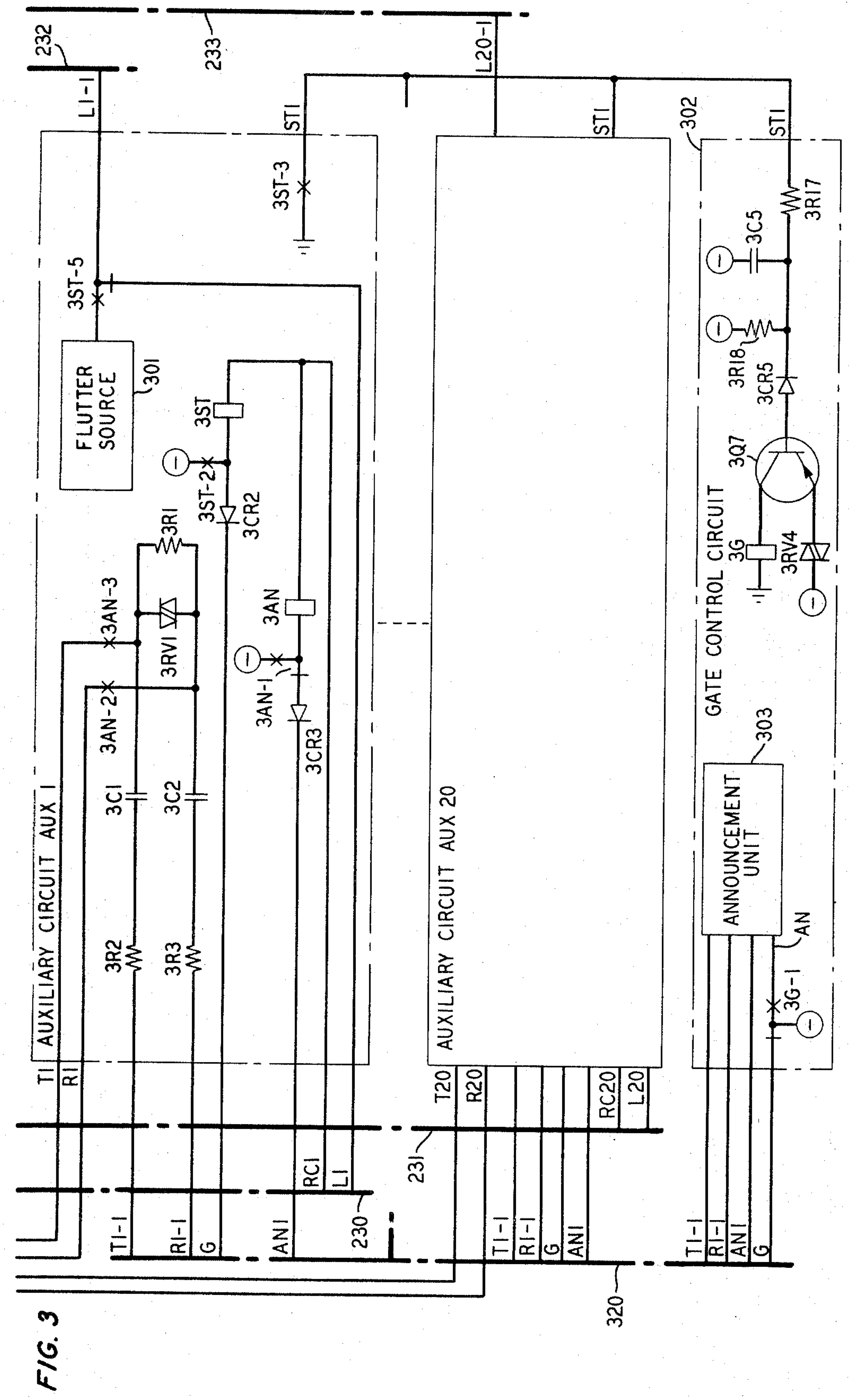
Figure 5:
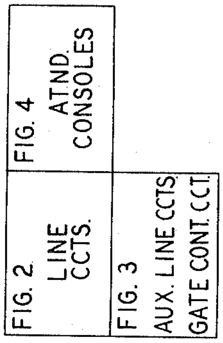
FIG. 5 shows the manner in which the other figures should be arranged.
Figure 4:
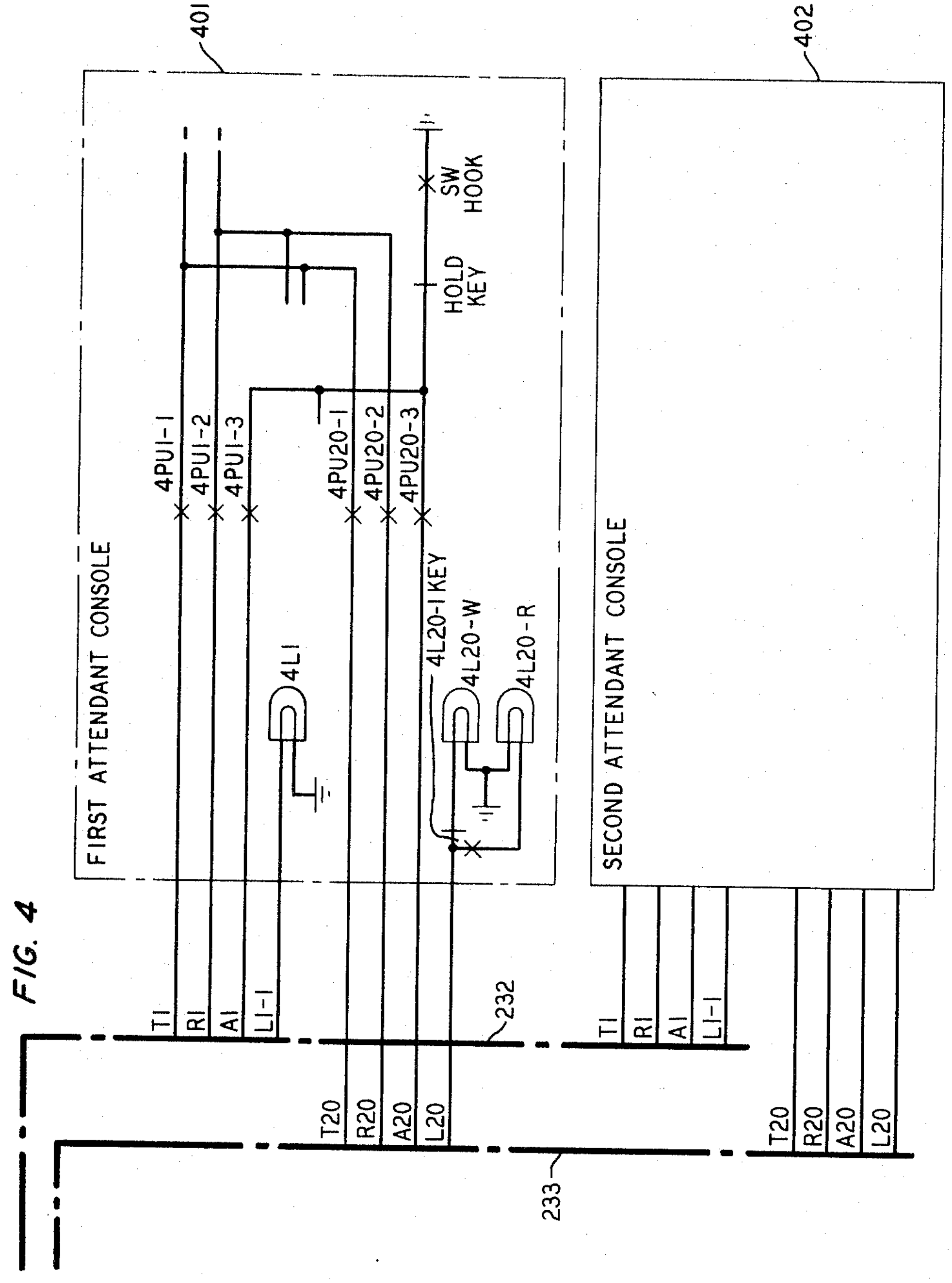

It will be noted that FIGS. 2 through 4 employ a type of notation referred to as "detached contact" in which an "X" shown intersecting a conductor represents a normally open contact of a relay and a bar shown intersecting a conductor at right angles represents a normally closed contact of a relay; "normally" referring to the unoperated condition of the relay. The principles of this type of notation are described in an article entitled "An Improved Detached Contact Type Schematic Circuit Drawing" by F. T. Meyer in the Sept. 1955 publication of the American Institute of the Electrical Engineers Transactions, Communications and Electronics, Vol. 74, pages 505–513.

It will be noted also that in order to simplify the disclosure and thus facilitate a more complete understanding of the embodiment, the relays, relay contacts and other electromechanical devices shown in FIGS. 2 through 4 have been given systematic designations. Thus, the number preceding the letters of each device correspond to the figure in which the control circuit of the device is shown. Thus, the coil of relay 2A is shown in FIG. 2. Each relay contact, either make, break or transfer, is shown with its specific contact number preceded by the designation of the relay to which it belongs. For example, the notation 2A-1 indicates contact number 1 of relay 2A the coil of which is shown in FIG. 2.

In order to further facilitate an understanding of the invention, the description of the operation of the exemplary embodiment has been subdivided into a general description portion designated 1.0 and a detailed description portion designated 2.0 . Section 1.0 describes the invention in general terms with respect to FIG. 1. Section 2.0 and its subsections describe the invention in detail with respect to FIGS. 2 through 4.

1.0 General Description

Figure 1:
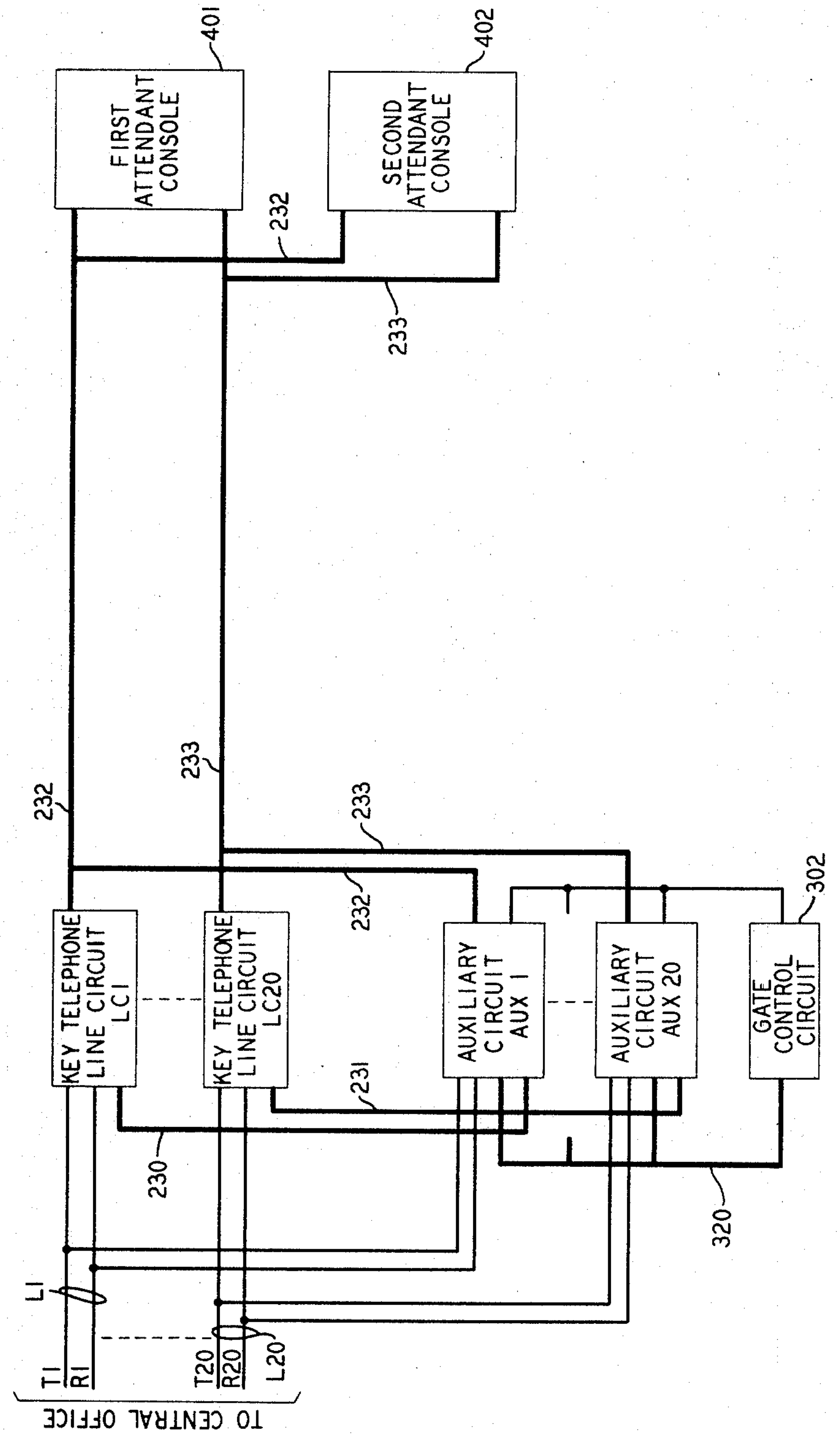
FIG. 1 is essentially a block diagram showing the interrelation of the exemplary embodiment of the invention.

Turning now to FIG. 1, it will be seen that the incoming lines L1-L20 go directly to key telephone line circuits LC1-LC20 which in turn are interposed on the line between the incoming line and the consoles 401–402. This is the normal well-known key telephone system arrangement. The key telephone line circuits LC1–LC20 represent what are known in the trade as key telephone units or line cards and function to supply the necessary lamp signals and ringing signals to the station. A typical key telephone unit, such as is represented by key telephone line circuit LC1, is shown in U.S. Pat. No. 3,436,488 issued to R. E. Barbato and D. T. Davis on Apr. 1, 1969. What I have added to convert such a typical key telephone system to perform the call distributing and call queueing functions is an auxiliary circuit, such as AUX 1, associated with each line circuit, and a gate control circuit 302. The auxiliary circuit functions to control the type of visual indication given to the attendant. This control is accomplished by the establishment of a first timed interval by the gate control circuit 302 during which all arriving calls are placed in a first group of calls and flutter signals are communicated to the console lamps associated with each such first group of calling lines.

For example, assume that calls arrive on lines L1 and L20 at time equals zero. The auxiliary circuit would function to cause the line lamps associated with these two lines at each of the consoles 401–402 to flutter at a fast pace thereby notifying the attendant that these lines should now be answered. The system is said to be functioning in the first mode during this interval. At a later point, when time equals T1, the gate closes and thereafter all calls incoming to the system are placed in a second group. The auxiliary circuit then functions to cause the line lamps at the consoles associated with all detected second group calls to flash at a rate different from the flutter rate. This is the second mode operation. The attendants at the consoles 401–402 are instructed that all lines with fluttering signals are to be answered prior to the answering of any line with a flashing signal. Accordingly, calls arriving first will be answered first.

When each call of the first group having a fluttering signal associated therewith on the console has been answered, the auxiliary circuit functions to convert all second group calls to first group calls. Accordingly, the flashing lamps on the console begin to flutter. The gate circuit is again operated and any subsequent incoming calls are placed in the second group of calls and the associated line lamps are again given flashing signals.

Thus it can be seen that calls are answered from the console in relatively the same order in which they arrive. However, since the calls are batch processed, as opposed to individually processed, and since the attendant has complete control over the operation of the pickup keys, the attendant has the option of answering any line out of order. Thus for priority operation it can be seen that any line given a priority designation can be immediately answered. Accordingly, in situations where for one portion of time one line is a priority line and for some other period of time another line is a priority line, major circuit changes need not be undertaken in order to permit the attendant to give priority service. Simply changing the color of the lamp signal on a particular line, either electronically by the operation of a switch or mechanically by the insertion of a different-colored cap on the lens, during the time when the associated line is a priority line will result in priority operation.

The auxiliary circuit is further arranged such that if any call, from either the first or second group, has not been answered within a certain predetermined time, a recorded announcement is returned to the calling subscriber informing the subscriber that the circuits are busy and that the call will be answered as soon as possible. the recorded announcement, under control of the auxiliary circuit and gate control circuit 302, continues to be repeated at timed intervals on each of the active incoming lines until the attendant actually answers that line.

2.0 Detailed Description

Turning now to FIG. 2, when a call is directed to the key telephone system over any line such as line L1, ringing potential is extended over leads T1 and R1 to the associated key telephone line circuit, which in the case of line L1 is key telephone line circuit LC1. The key telephone line circuit functions in a manner set forth in the Barbato et al patent such that, in response to ringing potential on the T1 and R1 leads, relay 2B operates. In such operation, when relay 2B operates, flashing potential from flash source 202 is extended to the console line lamp associated with the calling line over lead L1. I have modified that operation and instead of extending lead L1 directly to the console, that lead is extended via cable 230 to the associated auxiliary circuit, such as auxiliary circuit AUX 1, and via transfer contact 3ST-5 and lead L1-1 of cable 232 to FIG. 4, to the associated line lamp 4L1.

I have utilized an existing optional lead RC— from each of the key telephone circuits LC1 through LC20 by extending on that lead, such as lead RC1 from key telephone circuit LC1, a ground whenever the 2B relay is operated and the 2C relay is released. This situation exists whenever an unanswered call is incoming to the key telephone system or, in other words, when the line is in a busy calling condition. Assuming now an incoming active calling condition on line L1, thus the key telephone line circuit LC1 supplies a ground on lead RC1 and cable 230 to FIG. 3 to one side of the winding of relay 3ST. Assuming for the moment that no other incoming lines are currently in the active ringing condition, the 3G relay in gate control circuit 302 would be normal. Thus battery in gate control circuit 302 would be supplied via released break contact 3G-1 and lead G to auxiliary circuit AUX 1 and via forward biased diode 3CR2 to the other side of the 3ST relay winding thereby allowing the 3ST relay to operate. When relay 3ST operates in the auxiliary line circuit, the path through the auxiliary circuit from lead L1 to lead L1-1 is interrupted via enabled transfer contact 3ST-5 and flutter source 301, which source supplies flutter potential suitable for lamp operation, is connected to lead L1-1 of cable 232 to FIG. 4 to enable lamp 4L1 at each of the consoles in a fluttering manner. Since lamp 4L1 is associated with the pickup key for line L1, the attendant is given a first mode visual indication with respect to line L1.

Returning to FIG. 3, prior to the enabling of any auxiliary circuit, lead ST1 has no external potential thereon and transistor 3Q7 remains off, thereby maintaining relay 3G in a released condition. When line L1 becomes active, the associated auxiliary circuit AUX 1 becomes active and ground is supplied over lead ST1 to the gate control circuit 302 via enabled make contact 3ST-3. This ground is extended through resistor 3R17 to capacitor 3C5 and resistor 3R18. These elements act as a timing circuit to provide delayed operation for transistor 3Q7, which transistor operates after a certain interval, typically approximately 100 milliseconds, thereby operating relay 3G. The operation of relay 3G is the clock control for second mode operation.

The purpose for the delayed operation of relay 3G is so that any call incoming to the system during the interval prior to the operation of that relay is given the status of a first calling line and the associated 3ST relay in the auxiliary line circuit associated with a ringing active line is permitted to operate from battery on lead G. When relay 3G operates, battery is removed from lead G via enabled break contact 3G-1 thereby preventing the operation of any 3ST relay in any of the auxiliary circuits.

Thus, while the 3G relay remains operated, the system is in the second mode and any call incoming to the system over any line will have a flashing potential, from flash source 202 of the associated line circuit, connected over lead L1 and through the associated auxiliary circuit and through released break contact 3ST-5 and over the L1-1 lead to operate the associated line lamp in the console in a manner distinct from the fluttering manner used for first mode operation.

Since the attendant at each of the consoles is instructed to answer calls having fluttering line lamps before calls having flashing line lamps are answered, this procedure ensures that those calls incoming to the system first are answered first since the lines which have fluttering signals thereon came into the system at a time when the 3G relay was normal and the lines having flash potential thereon came into the system at a subsequent time.

When relay 3ST in auxiliary circuit AUX 1 operates, it locks operated to enabled make contact 3ST-2. Thus, once that relay operates, it will remain operated until such time as the ground potential is removed from the RC1 lead. Ground will remain on lead RC1 until such time as the associated line is answered or the call is abandoned. Accordingly, the operational status of each 3ST relay determines whether the associated line is in the calling connection busy or calling condition idle mode. Thus when all of the lines associated with fluttering lamps have been answered, all of the 3ST relays are released and the 3G relay in gate control circuit 302 releases and battery potential is again extended over lead G to all of the auxiliary circuits. When this occurs, ground from the RC— lead associated with all lines which are in the active ringing condition permit the associated 3ST relay in the auxiliary circuit to operate. Accordingly, the flash potential is removed from the associated L1-1 lead of any auxiliary circuit and the flutter potential is substituted therefor, under control of now enabled transfer contact 3ST-5. The subsequent re-enabling of any 3ST relay again causes the gate control circuit to establish a second timed period, after which relay 3G operates again placing the system in the second mode operation.

Thus it will be seen that call queueing and distributing is achieved with minimum circuitry in addition to the standard key telephone circuitry and without extensive modifications to existing key telephone systems.

2.1 Priority

It will be noted that any line given priority status may be answered by any attendant at any time that that line becomes currently active even though the active condition is detected when the system is in the second mode. Different-colored lamp lenses may be utilized to distinguish such priority lines for the attendant or an arrangement of electrically controlled distinctive signaling can be provided such as shown in conjunction with lamp 4L20-W of first attendant console 401 wherein, in response to the enabling of the 4L20-1 key, the 4L20-R lamp, which can be a red lamp, is operated. Numerous arrangements exist in the art so that the white and red lamps can be diode controlled and can be mounted in a single lamp holder associated with a single pickup key.

2.2 Announcement Operation

As discussed previously, when any call is incoming to the system the 3G relay operates and, as is shown in FIG. 3, battery is extended via enabled make contact 3G-1 to an announcement unit 303, which announcement unit is arranged in any one of the well-known circuit configurations operable at the expiration of a timed interval, as determined by battery potential on an input lead, for providing recorded announcements over a pair of talking leads, such as leads T1-1 and R1-1. Thus, when battery has been extended over lead AN for a period of time, for example 30 seconds, a recorded announcement is returned over leads T1-1 and R1-1 and cable 320 and resistors 3R2 and 3R3, and capacitors 3C1 and 3C2 to make contacts 3AN-2 and 3AN-3.

Concurrent with the enabling of the audio announcement, battery is extended from announcement unit 303 over lead AN1 and cable 320 to forward biased diode 3CR3 and released break contact 3AN-1 to one side of the winding of relay 3AN in each of the auxiliary circuits. The other side of the winding of each 3AN relay is connected to the associated RC— lead from the associated key telephone circuit, FIG. 2. If the associated line is in a ringing condition, as discussed previously ground is present on lead RC— thereby operating relay 3AN. When relay 3AN operates, it locks operated to battery via enabled transfer contact 3AN-1 to ground on the RC— lead, which ground remains on that lead until such time as the associated line is answered from the attendant console. Ground is removed from the RC— lead at that time by the operation of relay 2C, FIG. 2, via enabled break contact 2C-3. Thus, once announcement unit 303 is connected to the T1-1 and R1-1 leads of a line, the announcement continues to be returned in a continuous manner every 30 seconds until such time as the associated pickup key is operated and the 3AN relay in the auxiliary circuit is released.

Conclusion

Although the embodiment discussed herein has been in terms of a certain number of incoming lines all terminating at two consoles, it will be immediately obvious to anyone skilled in the art that any number of lines may be associated with one or more key telephone stations and that each line can terminate at as many or as few stations as is desired without departing from the spirit or scope of my invention. It should also be obvious that a third timed interval could be established and a third visual indication given with respect to calls incoming during that interval.

What is claimed is:

1. An auxiliary circuit for use in conjunction with a key telephone system wherein connections are selectively completed from any one of a number of telephone lines to a key telephone station in response to the operation of a key at said station associated with a selected one of said lines and wherein visual signal means associated with each calling connection awaiting completion is enabled at said station, said auxiliary circuit comprising means for detecting the busy-idle calling condition status of all said lines, means jointly responsive to an incoming calling connection on one of said lines and a detected idle calling condition status on all other said lines for enabling said visual signal means associated with said one calling connection line at said key telephone station in a first pulsating manner, and means jointly responsive to an incoming calling connection on a second one of said lines and a detected busy calling condition status on any other one of said lines for enabling said visual signal means associated with said second line calling connection at said key telephone station in a second pulsating manner distinct from said first pulsating manner.

2. The invention set forth in claim 1 further comprising means jointly responsive to an incoming calling connection on a third one of said lines and a detected busy calling condition status on any other one of said lines for enabling said visual signal means associated with said third line calling connection at said key telephone station in said second distinct pulsating manner.

3. The invention set forth in claim 2 further comprising means responsive to a detected idle calling condition status on any line having associated therewith visual signal means enabled in said first pulsating manner for inhibiting said enabling of any signal means enabled in said second pulsating manner and for enabling in a first pulsating manner any visual indicating means inhibited from said second pulsating manner operation.

4. In a key telephone system a telephone station, a plurality of telephone lines associated with said telephone station, means for directing communication connections from any of said telephone lines to said telephone station, means at said telephone station for selectively enabling a communication connection between said telephone station and an exclusive one of said telephone lines, means at said telephone station exclusively associated with each said telephone line for providing visual signals representing the status of each said associated telephone line, means for establishing a first timed period, means controlled by said first timed period establishing means and by said connection directing means for enabling in a first manner said visual signals associated with each line having a communication connection directed to said telephone station during said established first timed period, and means controlled by said first timed period establishing means and by said connection directing means for enabling in a second manner said visual signals associated with each line having a communication connection directed to said telephone station subsequent to the conclusion of said first timed period.

5. The invention set forth in claim 4 further comprising means for detecting when all said lines having communication connections directed to said station during said first timed period have been selectively answered, means operable in response to the enabling of said detecting means for inhibiting said second manner enabling of said visual means associated with each said line having a communication connection directed to said telephone station subsequent to said conclusion of said first timed period and for enabling in said first manner all said inhibited visual means.

6. The invention set forth in claim 5 further comprising means controlled by said enabling of said inhibiting means and said connection directing means for enabling in said second manner said visual signals associated with each line having a communication connection directed to said telephone station subsequent to the enabling of said inhibiting means.

7. The invention set forth in claim 6 further comprising audible announcement means, means controlled by the enabling of said first timed period establishing means for enabling said announcement means so as to return an audible announcement over any line having a communication connection directed to said telephone station, and means responsive to the selective enabling of any said line for inhibiting any said audible announcement associated with said selectively enabled line.

* * * * *